United States Patent

[11] 3,624,185

[72] Inventors Michael Lederer
Frankfurt am Main;
Werner Ehmann, Frankfurt am Main;
Fritz Marktscheffel, Glashutten, Taunus,
all of Germany
[21] Appl. No. 800,749
[22] Filed Feb. 19, 1969
[45] Patented Nov. 30, 1971
[73] Assignee Farbwerke Hoechst Aktiengesellschaft
vormals Meister Lucius & Bruning
Frankfurt am Main, Germany
[32] Priority Feb. 29, 1968
[33] Germany
[31] P 17 20 793.1

[54] PROCESS FOR THE MANUFACTURE OF PLASTICS MATERIALS HAVING A GOOD IMPACT STRENGTH
7 Claims, No Drawings
[52] U.S. Cl. ................................................... 260/880 R,
260/4 AR, 260/93.5 W
[51] Int. Cl. .......................................................... C08f 15/04,
C08f 7/04, C08f 1/11
[50] Field of Search .................................................. 260/93.5
W, 880

[56] References Cited
UNITED STATES PATENTS
3,043,817 7/1962 Jahn et al. ...................... 260/93.5
3,278,642 10/1966 Lee ................................ 260/880
3,284,542 11/1966 Carrock et al. ................. 260/880

Primary Examiner—James A. Seidleck
Attorney—Curtis, Morris & Safford

ABSTRACT: A process for the suspension polymerization of a prepolymer derived from a mixture of from 70 percent to 98 percent of a vinyl aromatic substance, 2 percent to 30 percent of one or more elastomers, which has been mass-polymerized to a conversion of 10 to 60 percent, in an aqueous phase in the presence of a dispersing agent, which comprises using, as a dispersing agent, a copolymer of an open-chain N-vinylamide of the formula

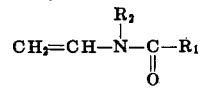

in combination with a salt of polyvinyl sulfonic acid.

PROCESS FOR THE MANUFACTURE OF PLASTICS MATERIALS HAVING A GOOD IMPACT STRENGTH

The present invention relates to an improved process, for the manufacture of plastics materials having a good impact strength.

For the manufacture of plastics materials having a good impact strength and which are derived from vinyl aromatics and elastomers, i.e. natural or synthetic rubbers, if necessary in the presence of acrylonitrile, acrylic esters or methacrylic esters, there are known processes in which solutions of the elastomers in styrene, in the presence or absence of one or more initiators, are polymerized in a first stage by a mass polymerization process to a conversion of 1 to 50 percent. The graft polymers or copolymers obtained in this manner are then, in a second stage, converted to give an aqueous suspension and polymerized with the addition of organic peroxides and/or azo compounds. As dispersing agents there are used high-molecular-weight compounds such, for example, as polyvinyl alcohol, hydroxyethylated celluloses, gelatine, if necessary in combination with low-molecular-weight emulsifiers, such as alkyl benzene sulfonates, alkyl sulfates and alkyl sulfonates. A disadvantage of these combinations is that, apart from bead polymerization, there may also occur emulsion polymerization with the formation of up to 4 percent of emulsion polymers, which highly impedes the isolation of the polymers. It has been proposed substantially to avoid this emulsion formation by the addition of electrolytes during the polymerization. However, the addition of salts adversely affects the electrical values of the polymers. As is known, the water absorption of the polymers is increased due to the emulsifiers and, with the use of larger amounts of emulsifiers, the workability of the polymers is impaired.

Now we have found that the aforementioned disadvantages in the manufacture of polymers having a good impact strength can be avoided and fine-grained products obtained which can be readily isolated by carrying out the suspension polymerization of a prepolymer derived from a mixture of from 70 to 98 percent of a vinyl aromatic substance, 2 to 30 percent of one or more elastomers, which has been mass-polymerized to a conversion of 10 to 60 percent, in an aqueous phase in the presence of a dispersing agent derived from a copolymer of an open-chain N-vinylamide of the formula

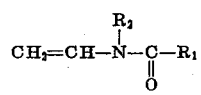

in which $R_1$ and $R_2$ each represents an alkyl radical having one to 20 carbon atoms, in which case $R_1$ may also represent a hydrogen atom, with a polymerizable vinyl compound, in combination with a small amount of an alkali metal salt of polyvinyl sulfonic acid.

There may be mentioned, for example, N-vinyl-N-methyl-formamide, N-vinyl-N-methylacetamide, N-vinyl-N-methyl-propionamide, N-vinyl-N-ethyl-acetamide, and N-vinyl-N-ethyl-propionamide as N-vinylamide components.

As copolymerization components of N-vinylamides there may be mentioned the esters of acrylic acid, methacrylic acid, maleic acid and fumaric acid having one to 19 carbon atoms in the alcohol component, moreover vinyl esters having one to 18 carbon atoms in the acid component.

The copolymers of N-vinylamides may be obtained by polymerization in mass or in solution, however, preferably by a precipitation polymerization in aliphatic hydrocarbons. The K values of the copolymers should be within the range of from 30 to 80, preferably 40 to 65, measured in a solution of 1 percent strength in methanol.

The ratio of the N-vinyl compound to the vinyl compound in the copolymers should be within the range of from 80:20 to 99.9:0.1, preferably 90:10 to 99.5:0.5 parts by weight. The dispersing agent is used at a rate of 0.01 to 5, preferably 0.05 to 1.0 parts by weight, calculated on the product of the first polymerization stage (prepolymer).

The salt of polyvinyl sulfonic acid is used at the rate of 0.001 to 0.1, preferably 0.0015 to 0.05 part by weight, calculated on the prepolymer. It can also be produced in situ during or prior to the polymerization. The salts that may be used are, for example, the sodium, potassium and ammonium salts of polyvinyl sulfonic acid.

The process is carried out in known manner such that, for the manufacture of the prepolymer of the first stage, an elastomeric component, such as a polymeric diene having four to six carbon atoms, for example a polymer of butadiene, isoprene, 2,3-dimethyl-butadiene, preferably a polybutadiene, containing 20 to 98 percent of cis 1,4-structure, which may, in addition, contain up to 10 percent of a vinyl 1,2-group, is dissolved in a vinyl aromatic substance such, for example, as styrene, vinyl toluene, α-methylstyrene or bromostyrene. The vinyl aromatic substance may, if necessary, contain up to 45 percent of acrylonitrile, acrylic acid esters or methacrylic acid esters. As elastomers there may also be used copolymers of the aforesaid dienes with 5 to 50 percent of styrene, acrylonitrile, acrylic esters or methacrylic esters. Of the elastomeric components there are used 2 to 30, preferably 3 to 25 parts by weight, dissolved in the vinyl aromatic substance.

Antioxidants and chain regulators may also be added to this solution.

The prepolymerization is either carried out by a thermal process at temperatures within the range of from 95° to 120° C. or in the presence of a peroxidic catalyst within the range of from 60° to 120° C. The polymerization is effected to a conversion of 10 to 60 percent, preferably 20 to 45 percent.

To effect polymerization in suspension, an aqueous phase, containing the water-soluble dispersing agent and the polyvinyl sulfonate as well as a minor amount (0.0005 to 0.01 percent, calculated on the prepolymer) of sodium, ammonium or potassium persulfate or cyclohexyl-carbonato-potassium-sulfato-peroxide, is heated at 50° to 70° C. and the prepolymer is added thereto.

The polymerization is carried out with the aid of peroxidic catalysts such as diacyl peroxides, dialkyl peroxides, alkyl hydroperoxides, peroxy esters or peroxy acetals alone or in mixture with one another at temperatures within the range of 60° to 150° C., preferably 90° to 130°C. As catalysts there may be mentioned, for example, dilauroyl peroxide, dibenzoyl peroxide, dinonanoyl peroxide, diisopropyl peroxy dicarbonate, dicyclohexyl peroxy dicarbonate, di-tert. butyl peroxide, dicumyl peroxide, tert. butyl peracetate, tert.butyl peroctoate, tert.butyl perbenzoate, tert. butyl perpivalate, α-(hydroxyethyl)-ethyl-tert.butyl peroxide. The catalysts are applied in an amount within the range of from 0.05 to 1, preferably 0.1 to 0.7 percent.

By the process of the present invention, fine-grained polymers are obtained which are easy to isolate and can be worked up into sheets having improved properties with respect to discoloration.

The prepolymer A used for the tests enumerated hereunder was obtained by a thermal polymerization of a solution of 8 percent polybutadiene having a content of 98 percent cis-1,4 structure in styrene with the addition of 2,6-di-tert.butyl-4-methylphenol, commercially available under the trade name of Ionol, over a period of 8 hours at 105° C. to a polymerization conversion of 30 percent.

The following examples serve to illustrate the invention, but they are not intended to limit it thereto:

EXAMPLES

In a 2-liter round-bottomed flask provided with stirrer, reflux-condenser and thermometer there were placed, respectively, 900 grams of water and the dispersing system, in an atmosphere of nitrogen. At 60°C., 600 grams of prepolymer A and 0.006 g. of potassium sulfate were added thereto, white stirring at a rate of 600 r.p.m. After 1 hour, there was added a solution of 1.8 g. of dibenzoyl peroxide and 0.3 g. of tert.butyl peracetate in 20 g. of styrene. The polymerization was carried out at 90° C. over a period of 8 hours and subsequently at 98° to 100° C. over a period of 4 hours. After cooling, the polymerization mixture was worked up by filtration, and the polymer was dried in vacuo at 90° C. The results are indicated in the table following hereunder. The polymers obtained according to examples 1 to 4 were easier to filtrate than those of Comparison Experiments 1 to 4.

The filtration period of the products obtained by the process of the invention was by the factor 5 to 6 shorter than in the case of the prior art products. Moreover, the amount of wash water required was about half that required for the prior art products while the losses of polymer due to the aqueous liquor were at least half those of the liquors obtained with polyvinyl alcohol.

We claim:

1. A process which comprises polymerizing a prepolymer, which prepolymer is obtained by mass polymerizing a mixture

| Example | Dispersing agent Type | Polymerization medium | K value | Amount, percent | Emulsifier Type | Amount | Particle size distribution 4 mm., percent | 2 mm., percent | <2 mm., percent |
|---|---|---|---|---|---|---|---|---|---|
| 1 | (a) | Hexane | 50 | 0.18 | | | 0.4 | 58 | 41.6 |
| 2 | (a) | do | 50 | 0.18 | PES[b] | 0.002 | | 38 | 62 |
| 3 | (a) | Water | 63 | 0.18 | | | 1.4 | 81 | 17.6 |
| 4 | (a) | do | 63 | 0.18 | PES[b] | 0.002 | | 76 | 24 |
| COMPARISON EXPERIMENTS WITH OTHER EMULSIFIERS | | | | | | | | | |
| 1 | (a) | Hexane | 50 | 0.18 | (c) | 0.002 | 2 | 67.5 | 30.5 |
| 2 | (a) | do | 50 | 0.18 | (d) | 0.002 | 0.07 | 90.6 | 9.3 |
| 3 | (a) | do | 50 | 0.18 | (e) | 0.002 | 0.12 | 79 | 20.7 |
| COMPARISON EXPERIMENTS WITH OTHER DISPERSING AGENTS | | | | | | | | | |
| 4 | PVA[f] | | | 0.18 | PES | 0.002 | 5.2 | 67 | 27.8 |
| 5 | (g) | | 30 | 0.18 | PES | 0.002 | | | |
| 6 | (g) | | 90 | 0.18 | PES | 0.002 | Coagulation | | |
| 7 | (h) | H₂O | 80 | 0.18 | PES | 0.002 | | | |
| 8 | | H₂O | 80 | 0.18 | | | | | |

[a] copolymer of N-vinyl-N-methylacetamide/2-ethylhexylacrylate (ratio 98/2),
[b] polyvinyl sulfonic acid, sodium salt
[c] sodium sulfonate of isobutyl naphthalene
[d] sodium lauryl sulfate
[e] alkyl-sulfonate of sodium
[f] polyvinyl alcohol
[g] polyvinyl pyrrodidone
[h] poly-N-vinyl-N-methyl-acetamide

EXAMPLE 5

The polymerization was carried out in a 16-liter autoclave at a rate of 250 r.p.m. under the same conditions as those described in example 2, except that 7.5 times the amount of the substances indicated in that example was used for the polymerization batch. Instead of at 98° to 100° C, the polymerization was completed at 105° C. over a period of 4 hours.

The polymer obtained was easy to separate. Ninety-nine percent of the beads had a particle size smaller than 2 mm. The beads still had a monomer content of 0.2 percent.

EXAMPLES 6 to 10

The prepolymer used in examples 6 to 10 following hereunder was obtained by polymerizing a solution of 10.44 g. of tert.dodecyl mercaptan, 17.1 g. of trinonyl phenyl phosphite, 5.7 g. of 2,6-di-tert.butyl-4-methylphenol and 913 g. of a polybutadiene with 35 percent, 1,4-cis-, 58 percent 1,4-trans- and 7 percent 1,2-double bonds in 10,167 g. of styrene over a period of 8 hours at 111° C., with agitation. The polymerization of the prepolymer obtained was completed in aqueous suspension under the conditions enumerated in the table following hereunder.

of from 70 to 98 percent by weight of a vinyl aromatic substance and from 2 to 30 percent by weight of an elastomer comprising a homopolymer of a conjugated diene or a copolymer thereof with a monomer selected from the group consisting of styrene, acrylonitrile, acrylic esters and methacrylic esters, to a conversion of 10 to 60 percent in a aqueous phase in the presence of (a) from 0.01 to 5 parts by weight, calculated on the weight of the prepolymer, of a dispersing agent comprising a copolymer of (1) an open-chain N-vinyl amide of the formula

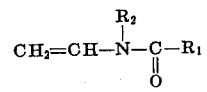

wherein $R_1$ represents a hydrogen atom or an alkyl of one to 20 carbon atoms and $R_2$ represents an alkyl of one to 20 carbon atoms, and (2) an ester of an acid selected from the group consisting of acrylic acid, methacrylic acid, maleic acid and fumaric acid, the ratio of N-vinyl amide to the vinyl comonomer ester being within the range of 80:20 to 99.9:0.1 parts by weight, and (b) from 0.001 to 0.1 parts by weight, calculated on the weight of the prepolymer, of an alkali metal salt of polyvinyl sulfonic acid.

| Examples | 6 | 7 | 8 | 9 | 10 |
|---|---|---|---|---|---|
| Suspension polymerization, catalyst: | | | | | |
| Benzoyl peroxide, percent | 0.3 | | | 0.3 | 0.3 |
| tert. Butyl peracetate, percent | 0.04 | | | 0.04 | 0.04 |
| tert. Butyl perbenzoate, percent | | 0.2 | 0.2 | | |
| Di-tert. butyl peroxide, percent | | 0.01 | 0.005 | | |
| Temperature, °C | 85-125 | 115-140 | 115-140 | 85-125 | 88-125 |
| Period, hours | 11 | 11 | 11 | 11 | 11 |
| Composition of the liquor: | | | | | |
| Dispersing agent, percent | PVM[c], 0.18 | PVM, 0.18 | PVM, 0.18 | PVA[d], 0.12 | PVA, 0.18 |
| emulsifier, percent | PES[e], 0.002 | PES, 0.002 | PES, 0.002 | LS[f], 0.02 | PES, 0.002 |
| NaNO₃, percent | | | | 0.2 | |
| K₂S₂O₈, p.p.m | 9.7 | 9.7 | 9.7 | 9.7 | 9.7 |
| Work-up:[a] | | | | | |
| Weight of dried polymer, grams | 650 | 580 | 570 | 470 | 470 |
| Apparent density, g./l | 555 | 560 | 570 | 490 | 512 |
| Filtration period, minutes | 0.75 | 0.6 | 0.5 | 3.5 | 3 |
| Wash water, l[b] | 3.5 | 3 | 3 | 5 | 6 |
| Solid material, liquor, percent | 0.72 | 0.34 | 0.42 | 1.84 | 1.13 |

[a] 1.5 l. of suspension were employed
[b] amount of wash water required until a clear filtrate ran off
[c] copolymer N-vinyl-N-methylacetamide/2-ethylhexylacrylate (98/2)
[d] polyvinyl alcohol
[e] polyvinyl sulfonic acid, sodium salt
[f] lauryl-sulfonate of sodium 2. The process of claim 1 wherein the elastomer is present in the prepolymer in an amount of from 3 to 25 percent by weight.

3. The process of claim 1 wherein the dispersing agent is present in an amount of from 0.05 to 1.0 part by weight, calculated on the weight of the prepolymer.

4. The process of claim 1 wherein the ratio of N-vinyl amide to the vinyl ester comonomer is within the range of 90:10 to 99.5:0.5 parts by weight.

5. The process of claim 1 wherein the alkali metal salt of polyvinyl sulfonic acid is present in an amount of from 0.0015 to 0.05 parts by weight, calculated on the weight of the prepolymer.

6. The process of claim 1 wherein the dispersing agent is a copolymer of N-vinyl-N-methylacetamide and 2-ethylhexyl acrylate.

7. The process of claim 1 wherein the vinyl aromatic substance is a member selected from the group consisting of styrene, vinyl toluene, $\alpha$-methylstyrene and bromostyrene.

* * * * *